United States Patent [19]

Weiler et al.

[11] Patent Number: 4,530,506
[45] Date of Patent: Jul. 23, 1985

[54] SEALING CAP FOR CYLINDRICAL PARTS, ESPECIALLY FOR A BOLT GUIDE OF A SPOT-TYPE DISK BRAKE

[75] Inventors: Rolf Weiler; Horst Kretzer, both of Frankfurt am Main; Hans-Dieter Leidecker, Eschborn; Winfried Gerhardt, Frankfurt am Main, all of Fed. Rep. of Germany

[73] Assignee: ITT Industries, Inc., New York, N.Y.

[21] Appl. No.: 632,818

[22] Filed: Jul. 20, 1984

[30] Foreign Application Priority Data

Jul. 22, 1983 [DE] Fed. Rep. of Germany ....... 3326482

[51] Int. Cl.³ .............................................. F16S 15/52
[52] U.S. Cl. ............................................ 277/212 FB
[58] Field of Search ................... 277/212 FB, 216, 29

[56] References Cited

U.S. PATENT DOCUMENTS

| 3,343,855 | 9/1967 | Husen | 277/212 FB |
| 4,469,337 | 9/1984 | Yokoi | 277/212 FB |
| 4,469,467 | 9/1984 | Odill | 277/212 FB |

Primary Examiner—Robert I. Smith
Attorney, Agent, or Firm—James B. Raden

[57] ABSTRACT

A sealing cap for mating to cylindrical parts such as the bolt guide of a spot-type disk brake. The cap includes a resilient boot one end portion of which is adapted to be secured circumferentially to a first cylindrical part and the other end portion of which is adapted to be secured circumferentially to a second cylindrical part. At least one of said end portion comprises a rigid insert member. In order that the sealing cap may be easily mounted and secured with no adverse effects, the other end portion may comprise a rigid insert member. Both insert memebers have at least a part of the radial extension thereof are disposed the same radial distance from the axis of the cylindrical parts.

12 Claims, 4 Drawing Figures

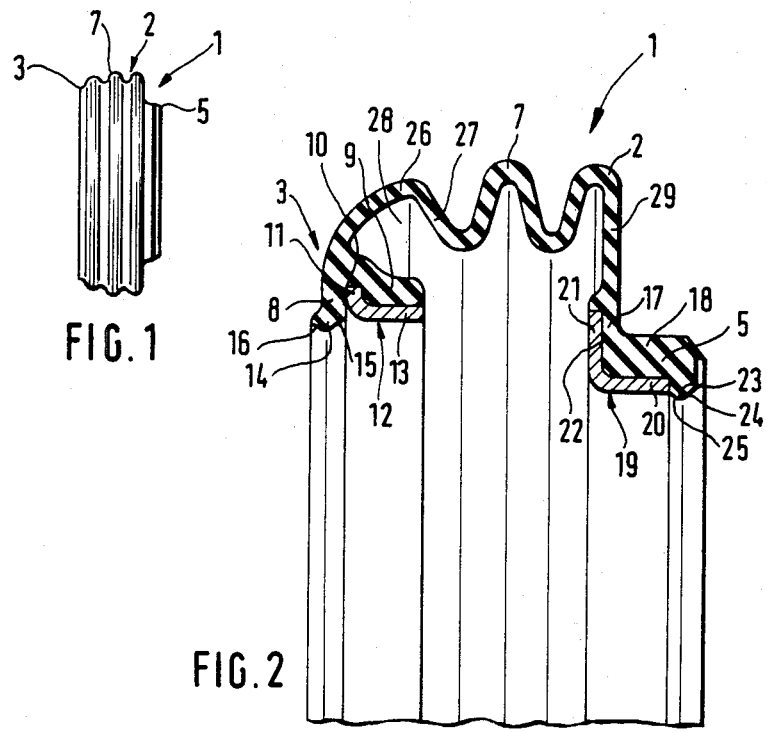
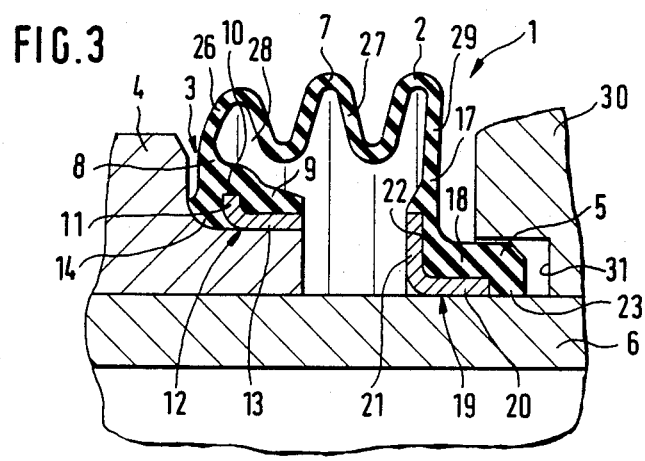

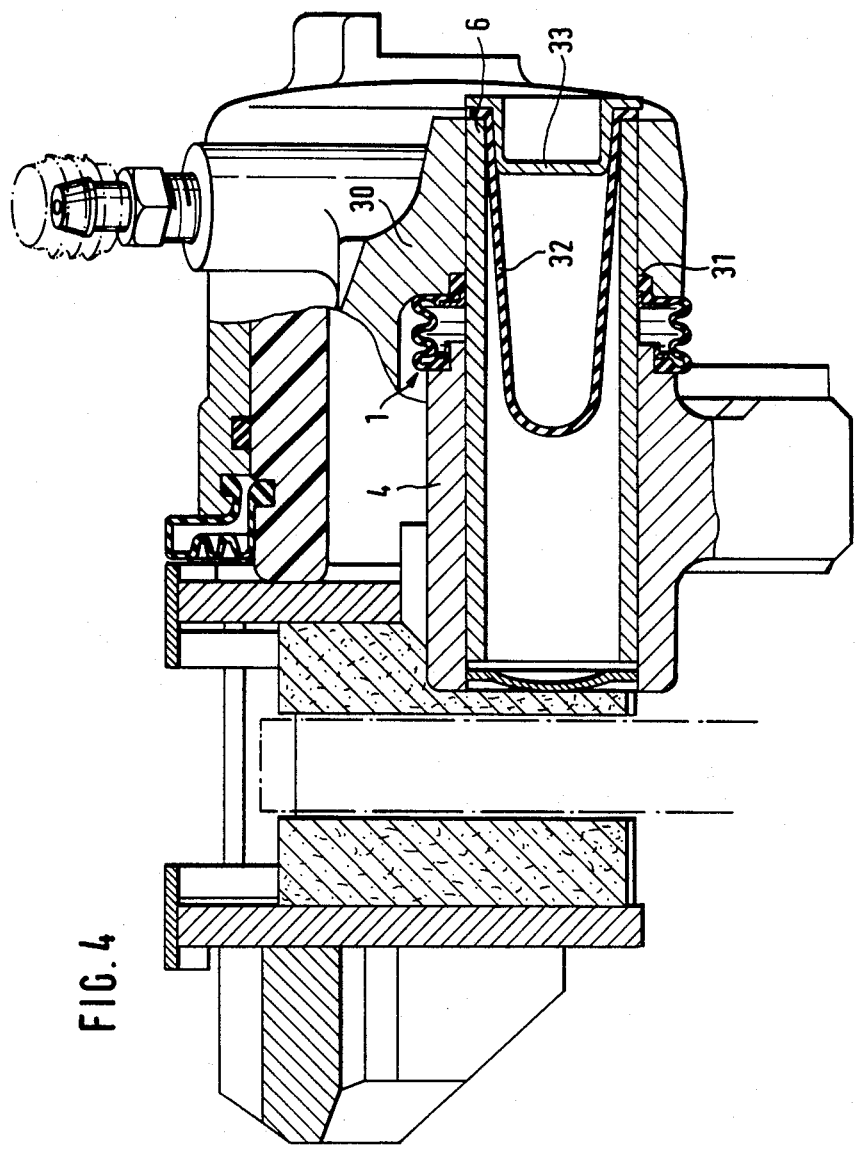

SEALING CAP FOR CYLINDRICAL PARTS, ESPECIALLY FOR A BOLT GUIDE OF A SPOT-TYPE DISK BRAKE

BACKGROUND OF THE INVENTION

The present invention is concerned with a sealing cap for cylindrical parts, especially for a bolt guide of a spot-type disk brake, comprising a resilient boot one end portion of which is adapted to be secured peripherally on a first cylindrical part and the other end portion of which is adapted to be secured peripherally on a second cylindrical part, and comprising a rigid insert member disposed within at least one of the end portions.

A sealing cap of this type is known from U.S. Pat. No. 4,199,159. That sealing cap was provided for a cylinder-and-piston assembly, with the piston at the outer periphery including an annular groove fitted into which is a first end portion of the sealing cap. Emerging from the first end portion, a folded section extends radially outwardly, with folds extending in the axial direction and passing over into a second end portion radially disposed further outwardly. Located in the second end portion is an insert member of substantially S-shaped configuration. The radially extending second end portion is seated in a correspondingly shaped circumferential groove in the cylinder of the piston-and-cylinder assembly. Securing of a sealing cap using the design of the reference involves substantial assembly effort as both the piston and the cylinder are required to be provided with correspondingly shaped and formed sealing grooves.

A second reference, German patent DE-OS No. 29 04 363 discloses a sealing cap for a piston-and-cylinder assembly provided with corresponding sealing grooves both in the piston and in the cylinder. An insert member in that cap is provided at the radially extending internal end portion to protrude with the one end of the resilient end portion. The folds in the sealing cap extend in a substantially radial direction. Securing that cap involves substantial effort because correspondingly shaped and processed grooves must be provided in the cylindrical portions. Difficulties are likely to arise with that cap during assembly in cases where a radially outwardly disposed portion of the one cylindrical member will cover the boot or seal so that, during assembly, it is not possible to visually determine whether the folds of the boot are regularly in place. In the absence of a way of determining the fold disposition, it is likely for the sealing cap to be damaged during relative movement between the cylindrical parts, i.e. in the present instance, between piston and cylinder, thereby preventing the cap from a reliable performance of its intended function.

SUMMARY OF THE INVENTION

It is, therefore, an object of the invention to provide a sealing cap of the afore-mentioned type that can be mounted and secured in simple manner with substantially no adverse effects on its serviceability caused by assembly.

That object, in accordance with the invention, is attained in that both end portions of the seal include a rigid insert member and that both insert members have at least a part of the radial extension on the same radius.

The present construction provides a sealing cap that can be secured in simple manner to two cylindrical parts, especially a bolt guide comprising a bolt slidably disposed in a bore of a corresponding configuration, with no need for providing sealing grooves on either of the two parts. In particular, the cap of the invention is suitable for use with an arrangement in which a radially extending outer cylindrical part surrounds the inner portion thereby providing an annular space therebetween in which to fit the cap, which space cannot be looked into after assembly of the two portions.

Another advantage of a sealing cap according to the invention resides in that both insert members in the end portions at the same time form a mounting aid. During assembly of the sealing cap, the one insert member may be urged against the other insert member to move the same in the axial direction into its final sealing position.

According to a preferred embodiment of the invention, which is especially beneficial for manufacturing and assembly, at least one of the insert members is provided with a form of an insert ring which, in longitudinal section, preferably is of an L-shaped configuration.

To permit easy attachment of the cap to the cylindrical parts, at least one of the insert rings serves as a sealing element to seal the corresponding end portion peripherally of the cylindrical part, with the insert ring being directly seated on the associated cylindrical part. According to an advantageous embodiment of the principle of the invention, at least one of the end portions includes lips radially projecting inwardly via the insert members, which lips are in abutment with the cylindrical parts to form axially outwardly disposed protection for both insert members.

According to another embodiment of the invention, at least one of end portions, in longitudinal section, is of a substantially L-shaped configuration, with one leg of the L-shaped end portion extending axially and said other leg extending radially. The configuration of the end portions is stable and especially suitable for the use of L-shaped insert members.

In manufacturing the sealing cap, it is feasible for the insert members to be fitted in a recess of the one end portion which surrounds the outer peripheral surface thereof, and to be connected to the end portion by methods such as vulcanization. The second insert member, preferably includes a portion extending into a groove of the associated end portion. The portion of the insert member fitted into the end portion, preferably, is a radially extending leg of an insert ring which, in the longitudinal section, is of L-shaped configuration, with the second leg extending in the axial direction and the axially extending leg of the insert ring being disposed in the area of a radially extending leg of the other insert member.

To provide optimum freedom of movement and to safeguard the folds of the bellows section of the cap, especially in constricted space conditions, according to another embodiment of the invention, the folded section disposed between the end portion of the boot, comprises a portion emerging from one of the end portions and extending radially in barrel-type form toward the other end portion joined by the folds of the folded section. The barrel-type portion of maximum possible size forms an uptake space for the folds. Emerging from the other end portion of the cap is a substantially radially extending portion joined by the folds of the folded section.

To permit easy assembly, slippage phases may be provided at the radially internally disposed ends of the end portions.

BRIEF DESCRIPTION OF THE DRAWINGS

The invention will now be described in greater detail by way of one example of an embodiment as illustrated in the drawing, wherein:

FIG. 1 is a side view in elevation of a boot of the type according to the invention;

FIG. 2 is a longitudinal section, in enlarged scale, through the boot of FIG. 1;

FIG. 3 is a section corresponding to FIG. 2, through a boot as used with a spot-type disk brake, and FIG. 4 is a partial section through a spot-type disk brake (caliper-type) having a sealing cap according to FIGS. 1 and 2.

DETAILED DESCRIPTION

As shown in FIGS. 1–3 sealing cap 1 includes a resilient boot 2, one end portion 3 of which is adapted to be secured peripherally to a first cylindrical part 4, and the other end portion 5 of which is adapted to be secured peripherally to a second cylindrical part 6 with the cylindrical parts aligned on parallel axes. Provided between the axially spaced end portions 3 and 5 of the boot, boot contains a body section bridging the space therebetween.

End portion 3, in longitudinal section (FIGS. 2 and 3), is of substantially L-shaped configuration, with a leg 8 extending in the radial direction and a leg 9 substantially extending in the axial direction.

An annular groove 10 is provided approximately at the point of intersection of the legs 8 and 9, i.e. in the area where end portion 3 has a relatively great bulk of material. Fitted tightly into annular groove 10 is a radially extending leg 11 of a rigid insert member 12 which, in longitudinal section, is of an L-shaped configuration. The second leg 13 of the insert member 12 extends in parallel to leg 9 of end portion 3 and is in abutment therewith. The radially extending leg 8 of end portion 3 slightly protrudes radially inwardly beyond the inner periphery of leg 13 of insert element 12 to form a sealing lip 14 which in the mounted condition as shown in FIG. 3 is in abutment with the outer periphery of the cylindrical part 4. The sealing lip 14 is provided with an inner slippage section 15 and an outer slippage surface 16.

The second end portion 5, in longitudinal section, is also of an L-shaped configuration, with one leg 17 of the L-shaped end portion 5 extending in the radial direction and the other leg 18 extending in the axial direction. Connected to end portion 5 of the boot by vulcanization, is an insert member 19 which, in the longitudinal section, is of L-shaped configuration. One leg 20 of the insert element 19 extends axially and, hence, in parallel to leg 18 of end portion 5, while the other leg 21 of the insert element 19 extends radially and, hence, in parallel to leg 17 of end portion 5. Provided in end portion 5 is a recess 22 of L-shpaed configuration adapted to the shape of insert member 19 and surrounding the insert member 19 at the outer side thereof. End portion 5, also, includes a radially inwardly protruding lug forming a sealing lip 23 which is provided with slippage surfaces 24 and 25.

Insert members 12 and 19 are so provided in end portions 3 and 5 of the sealing cap 1 that at least in part they are positioned at the same radial distance from the axis of the cylindrical parts. In particular, in the embodiment as shown, the axially extending leg 13 of insert member 12 is located radially within the area of leg 21 of insert element 19 extending in the radial direction so that leg 13 upon axial movement of the insert member 12, will rest in abutment with leg 21.

Emerging from boot end portion 3 is a barrel type of bellows portion 26 extending radially to the other end portion 5 joined by the folds of folded section 7. Portion 26 along with leg 9 of end portion 3 and the first folded section 27, forms a large take-up space 28 into which are movable the folds of fold section 7 when end portions 3 and 5 axially approach one another. Emerging from said other end portion 5 is a substantially radially extending portion 29 joined by the folds of folded section 7.

Sealing cover 1 can be mounted, as described in the following manner into a caliper-type disk brake as shown in FIG. 4.

Pressed into housing 30 of the caliper-type disk brake is the second cylindrical part 6 formed as a supporting sleeve so as to be integrally formed with housing 30. Provided therein is a recess 31 for receiving the one end portion 5 of the sealing cap 1. The cap by means of a mounting tube is pushed onto the supporting sleeve of the cylindrical part 6 to cause end portion 5 of the sealing cap to pass into recess 31. The first cylindrical part 4 in the form of a displaceable brake carrier is pushed onto supporting sleeve 6 to such an extent as to cause the lowered end thereof to engage the end portion 3 of the sealing cap 1. Brake carrier cylindrical part 4 is further pushed until leg 13 of end portion 3 abuts with leg 21 of end portion 5.

In order to permit manufacturing tolerances to be offset between housing 30 and brake carrier cylindrical part 4, sealing lips 14 and 23 protrude beyond end portions 3 and 5. Such lips will safeguard the radial sealing action. In the axial direction, sealing lip 14 will form a buffer at the same time serving as a seal, and will provide for tolerance compensation.

An equalizing element 32 is additionally provided in the supporting sleeve cylindrical part 6 in order to offset the volume differences caused by the displacement of the brake carrier cylindrical part 4. The equalizing element 32 is configured as a rubber bag and secured by means of a closure cover 33 on supporting sleeve 6 into which protrudes the rubber bag 32.

What is claimed is:

1. A sealing cap for cylindrical parts, such as a bolt guide of a spot-type disk brake, comprising a continuous resilient boot, one end portion of the boot being adapted to be secured circumferentially to a first cylindrical part of a first diameter and the other end portion of which is adapted to be secured circumferentially to a second cylindrical part of a second diameter different than said first diameter with both cylindrical parts aligned on the same axis, and comprising rigid insert members, one insert member in each of said end portions, wherein both insert members with at least a part of their radial extensions are disposed the same radial distance from the axis of the cylindrical parts such that, upon axial movement of said end portions toward each other, said rigid insert members will abut each other.

2. A sealing cap according to claim 1, in which the insert members are formed as insert rings.

3. A sealing cap according to claim 1, in which at least one of said insert members in longitudinal section is of L-shaped configuration.

4. A sealing cap according to claim 1, in which at least one of said insert members serves as a sealing element for sealing the corresponding end portion circumferentially to the respective cylindrical part.

5. A sealing cap according to claim 1, in which at least one of the end portions includes lips protruding radially inwardly beyond the insert members.

6. A sealing cap according to claim 5, in which at least one of the end portions in longitudinal section, is of substantially L-shaped configuration, with one leg of the end portion extending axially and the other leg extending radially.

7. A sealing cap according to claim 6, in which one of said insert members is disposed in a recess of said one end portion which surrounds it outer peripheral surface, and is connected by vulcanization to the other end portion.

8. A sealing cap according to claim 7, in which at least one of said insert members comprises a portion fitted into a groove of the adjacent end portion.

9. A sealing cap according to claim 8, in which the portion of the insert member fitted into said adjacent end portion is a radially extending leg of an insert ring which, in longitudinal section, is of L-shaped configuration, the other leg of which extends in the axial direction.

10. A sealing cap according to claim 9, in which an axially extending leg of an insert member preferably such as an insert ring is disposed in the area of a radially extending leg of the other insert member.

11. A sealing cap according to claim 10, in which there is a folded section disposed between the end portions of the boot the folded section, including a section emerging from one of said end portions and extending in barrel-type form radially and toward said other end portion, said barrel form section being joined by the folds of the folded section.

12. A sealing cap according to claim 11, in which the folded section disposed between the end portions comprises a section emerging from one of said end portions and extending substantially radially, which section is joined by the folds of folded section.

* * * * *